US012730762B1

(12) United States Patent
Machulsky et al.

(10) Patent No.: US 12,730,762 B1
(45) **Date of Patent: *Sep. 8, 2026**

(54) DYNAMIC RESOURCE MANAGEMENT OF NETWORK DEVICE

(71) Applicant: Amazon Technologies, Inc., Seattle, WA (US)

(72) Inventors: Georgy Machulsky, San Jose, CA (US); Nafea Bshara, San Jose, CA (US); Netanel Israel Belgazal, Qiryat Bialik (IL); Evgeny Schmeilin, Haifa (IL); Said Bshara, Tira (IL); Alexander Matushevsky, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,256

(22) Filed: May 20, 2024

Related U.S. Application Data

(63) Continuation of application No. 17/444,352, filed on Aug. 3, 2021, now Pat. No. 12,026,103, which is a (Continued)

(51) Int. Cl.

| | |
|---|---|
| ***G06F 13/00*** | (2006.01) |
| ***G06F 3/06*** | (2006.01) |
| ***G06F 9/455*** | (2018.01) |
| ***G06F 13/16*** | (2006.01) |
| ***G06F 13/28*** | (2006.01) |

(Continued)

(52) U.S. Cl.
CPC ............ *G06F 13/16* (2013.01); *G06F 3/0604* (2013.01); *G06F 3/0631* (2013.01); *G06F 3/067* (2013.01); *G06F 9/45558* (2013.01); *G06F 13/28* (2013.01); *G06F 13/4068* (2013.01);

(Continued)

(58) Field of Classification Search
CPC ...... G06F 13/16; G06F 3/0604; G06F 3/0631; G06F 3/067; G06F 9/45558; G06F 13/28; G06F 13/4068; G06F 13/4282; G06F 2009/45583; G06F 2009/45595
See application file for complete search history.

(56) References Cited

U.S. PATENT DOCUMENTS 6,145,061 A 11/2000 Garcia et al.
7,865,638 B1 * 1/2011 Wyatt ................ G06F 12/0284 711/170

(Continued)

OTHER PUBLICATIONS

U.S. Final Office Action dated Oct. 24, 2023 in U.S. Appl. No. 17/444,352.

(Continued)

*Primary Examiner* — Henry Tsai
*Assistant Examiner* — Kim T Huynh
(74) *Attorney, Agent, or Firm* — Weaver Austin Villeneuve & Sampson LLP

(57) ABSTRACT

A resource request is received by a peripheral device from host processing logic. The resource request includes a requested resource size. The peripheral device allocates resource of the peripheral device in response to the resource request. A resource response is sent by the peripheral device to the host processing logic. The resource response includes information indicating a location of the allocated resource.

20 Claims, 8 Drawing Sheets

Related U.S. Application Data continuation of application No. 15/099,188, filed on Apr. 14, 2016, now Pat. No. 11,086,801.

(51) Int. Cl.
*G06F 13/40* (2006.01)
*G06F 13/42* (2006.01)

(52) U.S. Cl.
CPC .................... *G06F 13/4282* (2013.01); *G06F 2009/45583* (2013.01); *G06F 2009/45595* (2013.01)

(56) References Cited

U.S. PATENT DOCUMENTS

| | | | | |
|---|---|---|---|---|
| 8,683,110 | B2 | 3/2014 | Suzuki et al. | |
| RE45,097 | E | 8/2014 | Iyer et al. | |
| 11,086,801 | B1 | 8/2021 | Machulsky et al. | |
| 12,026,103 | B1 | 7/2024 | Machulsky et al. | |
| 2005/0286544 | A1* | 12/2005 | Kitchin | H04L 49/90 370/428 |
| 2013/0138970 | A1 | 5/2013 | Resch et al. | |
| 2013/0262718 | A1 | 10/2013 | Vasudevan et al. | |
| 2015/0215226 | A1 | 7/2015 | Peled et al. | |
| 2015/0301759 | A1* | 10/2015 | Gu | G06F 3/0607 711/114 |
| 2015/0334696 | A1* | 11/2015 | Gu | H04L 67/1095 718/1 |
| 2016/0119402 | A1 | 4/2016 | Kumar | |
| 2016/0239323 | A1 | 8/2016 | Tsirkin et al. | |
| 2017/0103208 | A1* | 4/2017 | Bramley, Jr. | G06F 9/45558 |
| 2021/0373955 | A1* | 12/2021 | Galles | G06F 12/0284 |
| 2023/0124665 | A1* | 4/2023 | Hong | G06F 3/0631 711/154 |

OTHER PUBLICATIONS

U.S. Final Office Action dated Sep. 20, 2019 in U.S. Appl. No. 15/099,188.

U.S. Non-Final Office Action dated Apr. 13, 2023 in U.S. Appl. No. 17/444,352.

U.S. Non-Final Office Action dated Aug. 7, 2018 in U.S. Appl. No. 15/099,188.

U.S. Non-Final Office Action dated Dec. 15, 2020 in U.S. Appl. No. 15/099,188.

U.S. Non-Final Office Action dated Dec. 28, 2017 in U.S. Appl. No. 15/099,188.

U.S. Non-Final Office Action dated Mar. 8, 2019 in U.S. Appl. No. 15/099,188.

U.S. Non-Final Office Action dated Sep. 21, 2022 in U.S. Appl. No. 17/444,352.

U.S. Notice of Allowance dated Apr. 8, 2021 in U.S. Appl. No. 15/099,188.

U.S. Notice of Allowance dated Feb. 22, 2024 in U.S. Appl. No. 17/444,352.

* cited by examiner

DYNAMIC RESOURCE MANAGEMENT OF NETWORK DEVICE

CROSS-REFERENCE TO RELATED APPLICATIONS

This application is a continuation of U.S. patent application Ser. No. 17/444,352, filed Aug. 3, 2021, and issued as U.S. Pat. No. 12,026,103 on Jul. 2, 2024, entitled "DYNAMIC RESOURCE MANAGEMENT OF NETWORK DEVICE," which is a continuation of U.S. patent application Ser. No. 15/099,188, filed Apr. 14, 2016, and issued as U.S. Pat. No. 11,086,801 on Aug. 10, 2021, entitled "DYNAMIC RESOURCE MANAGEMENT OF NETWORK DEVICE," the contents of which are herein incorporated by reference in their entireties.

BACKGROUND

Computing systems may include network devices that add to the functionality of the computing system. In many cases, network devices are connected to the computing system using an interconnect. The interconnect may implement a standard bus protocol, such as any of the Peripheral Component Interconnect (PCI) family of bus protocols. It is common for the network device to be in the form of a network interface card (NIC) that is interconnected with the host processor by way of an interconnect. A host processor may send packets to the NIC for transmission onto a network.

BRIEF DESCRIPTION OF THE DRAWINGS

Various embodiments in accordance with the present disclosure will be described with reference to the drawings, in which.

DETAILED DESCRIPTION

Figure 1:
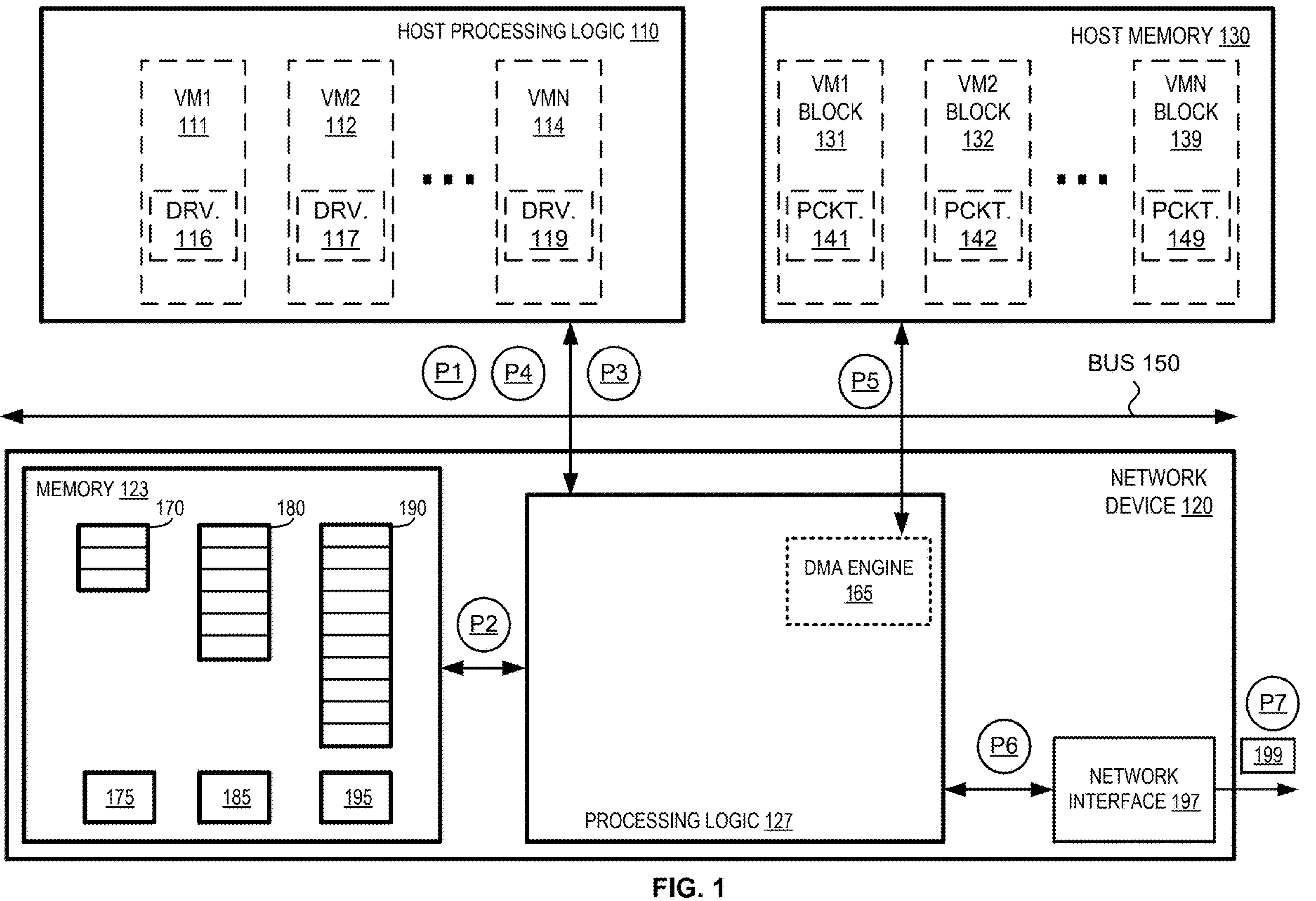
FIG. 1 illustrates a hybrid block diagram flow showing an example process of allocating resources of a network device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems, devices, and methods of the disclosure describe dynamically allocating resources of a network device. The network device includes an interface that exposes the network device's resources to a driver on a host processor, for example. The network device resources are allocated by the firmware or state machines of the network device since the firmware is in the best position to understand what resources are available. Once the network device allocates the resources, the driver/software on the host processor can utilize the resources. By having the network device manage its own resources, it can retain the same interface with the host software, even when new resources or new firmware is included in the network device. In this way, the driver/software on the host does not necessarily need to be updated even when the network device is updated/upgraded.

To accomplish this, the network device receives resource requests and allocates resources in response to the resource requests. The network device sends back resource responses that may include a resource identifier, a physical location of the resource, and a size of the resource. These data elements give the driver/software the information they need to utilize the resource that the network device allocated. Example resources include submission queues (and any related registers to manage the submission queues), completion queues (and any related registers to manage the completion queues), Virtual Local Area Network (VLAN) tables, media access control (MAC) tables, flow tables, firewall rule tables, packet header buffers, and Receive Side Scaling (RSS) indirection tables.

In a particular implementation, a computing system includes a host processor, a host memory, and a network device, which are interconnected by a PCI-based bus. Virtual Machines (VMs) running on the host processor or processing cores of the host processor send queue requests to the network device that specify a size of a queue that the VM needs for network packets. The size of the requested queue may correspond to the volume of packets that the VMs or processing cores expect to send or receive. The network device receives the queue requests from VMs or processing cores and the firmware of the network device allocates memory of the network device to accommodate the queue request. While the computing system is running, the VMs or processing cores may increase or decrease the size of the queue assigned to them by the network device by sending a subsequent queue request and the network device will then reallocate the memory space to accommodate the size of the subsequent queue requested. In this way, the network device exposes its resources to the host and can dynamically allocate resources (e.g. memory resources) according to the real-time needs of certain VMs or processing cores of the host.

In contrast to the examples of this disclosure, conventional network devices may allocate resources for different processing cores or VMs based on a queue location specified by the VM rather than the network device deciding the queue location. And, this conventional allocation may only be performed once during a startup of the computing system. Furthermore, the resource allocation may be evenly distributed even when different VMs and/or processing cores have vastly different network resources requirements. For example, one VM may periodically send and receive network packets of a relatively small volume. In contrast, another VM that is utilized for video or audio content may be constantly sending and receiving a high volume of network packets. Hence, it can be more efficient to dynamically allocate resources of the network device to accommodate the needs of different VMs or processing cores.

As another potential advantage of the disclosure, the firmware of the network device may be responsible for allocating the memory of the network device rather than having VMs or processing cores dictate the memory allocation and memory addresses for network queues. Instead, the firmware of the network device is better positioned to assess its own memory and allocate network queues requested by various VMs. In an aspect of this disclosure, the network device responds to queue requests with queue responses that tell the VM that requested the queue the location of the queue to allow the firmware of the network device (and not the VMs) to be responsible for allocating the memory of the network device for the requested queues. In yet another potential advantage of the disclosure, creating a standard interface for a host processor to interact with a network device allows for changes in the network card without a requirement for a driver update on the host processor since the interface to the network device can remain the same even while the hardware or firmware of the network device may have changed.

FIG. 1 illustrates a hybrid block diagram flow showing an example process of delivering a packet from host processing logic 110 to a network device 120. FIG. 1 includes host processing logic 110, a network device 120, a host memory 130, and a bus 150. In one embodiment, a "host" includes host processing logic 110 and host memory 130. Although FIG. 1 includes blocks to represent particular hardware, the electrical connections illustrated in FIG. 1 are not necessarily complete as FIG. 1 is presented to show the flow of a process that includes the illustrated hardware components.

Host processing logic 110 may include one or more processors, microprocessors, field-programmable gate arrays (FPGAs) or other suitable processing logic. The processors may be general purpose computing devices such as are manufactured by Intel®, AMD®, ARM®, Qualcomm®, and others. The processors are generally capable of executing software code. A processor may include multiple processing cores.

The host memory 130 may provide temporary or long-term storage for data that may be accessed by host processing logic 110. The host memory 130 may include Dynamic Random Access Memory (DRAM), Synchronous DRAM (SDRAM), and/or Double Data Rate (DDR), among others. In some cases, host memory 130 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others.

Bus 150 in FIG. 1 may be any suitable bus for writing data from host processing logic 110 to network device 120. Bus 150 is also used by network device 120 for accessing and storing data stored in host memory 130, as will be described in more detail below. Bus 150 implements one or more variations of the Peripheral Component Interconnect (PCI) standard bus protocols, in some embodiments. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. Other bus protocols can be used for bus 150, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

In the illustrated example of FIG. 1, a plurality of virtual machines (VMs) are running on host processing logic 110. Specifically, first virtual machine 111, second virtual machine 112, and Nth virtual machine 114 are configured to run on host processing logic 110. In one example, 64 VMs run on host processing logic 110, which may have multiple processing cores. "Bare-metal" environments where host processing logic 110 does not run VMs are also possible, in some examples. Each of the virtual machines may execute a respective guest operating system (not shown) on host processing logic 110. In FIG. 1, each VM has a respective driver to interact with network device 120. In other examples, the VMs may utilize a driver of a hypervisor configured to manage one or more virtual machines on host processing logic 110.

Also in FIG. 1, each VM has a corresponding block of memory in host memory 130. Specifically, first virtual machine 111 has a corresponding block of memory 131, second virtual machine 112 has a corresponding block of memory 132, and Nth virtual machine 114 has a corresponding block of memory 133. Of course, any other virtual machine between the first VM and the Nth VM may also have their own corresponding block of memory of host memory 130. The block of host memory corresponding to a VM may be used to store executable instructions and data generated by each VM. A portion of each block of memory may be reserved for (and be accessible to) the driver that interacts with network device 120. For example, a portion of block 131 may be reserved for driver 116 to read and write packet data. In the illustrated example, packet data 141 is stored in a portion of block 131 that is accessible to driver 116. Similarly, packet data 142 is in a portion of block 132 that is reserved for driver 117, and packet data 149 is in a portion of block 133 that is reserved for driver 119.

In FIG. 1, one of the VMs running on host processing logic 110 may need to send and/or receive network packets utilizing network device 120. Network device 120 is a Network Interface Card (NIC), in one example. At processing block P1 of FIG. 1, the driver (e.g. 116) of the VM (e.g. 111) will send a resource request to the network device 120. The resource request may be sent from host processing logic 110 to network device 120 over bus 150. The resource request may be received by a bus interface (not illustrated in FIG. 1) of network device 120. The resource request includes a size of the resource that the VM is requesting to be allocated in the device memory 123 of network device 120. Example resources include submission queues (and any related registers to manage the submission queues), completion queues (and any related registers to manage the completion queues), Virtual Local Area Network (VLAN) tables, media access control (MAC) tables, flow tables, and Receive Side Scaling (RSS) indirection tables. Where the resource requested is a queue, the resource request is a queue request and the queue will be utilized to read and/or write network packets, for example. Processing logic 127 of network device 120 receives the resource request and allocates the resource size in response to receiving the queue request, in process block P2. Where the resource is a queue, processing logic 127 of network device 120 receives the queue request and allocates queue memory space in device memory 123 in response to receiving the queue request, in process block P2. In the illustrated embodiment, memory space 170 represents the memory space for a first queue reserved for VM1 111. In one example, the queue includes storage for 1000 entries that are 128 bytes per entry. VM2 112 through VMN 114 may also send queue requests that include a size of a network queue that is requested by the VM. In the illustrated example, memory space 180 is allocated to a second queue reserved for VM2 112 and memory space 190 is allocated to a third queue reserved for VMN 114. In FIG. 1, VMN 114 requested a queue (the third queue) that is larger than the queue (the second queue) that was requested by VM2 112. And, VM2 112 requested a queue (the second queue) that is larger than the queue (the first queue) that was requested by VM1 111. Hence, the memory space 190 is larger than memory space 180 and memory space 180 is larger than memory space 170.

In addition to allocating a queue of the requested size in memory 123, processing logic 127 may also allocate queue registers that are for managing a respective queue. In the illustrated example, queue registers 175 are for managing the first queue in memory space 170.

After allocating the requested resource (e.g. registers and/or memory), the network device 120 sends a resource response to the host or VM that made the resource request, in process block P3. The resource response may include a resource identifier (e.g. queue number), a physical location of the resource (e.g. memory location of the start of the resource), and/or a size of the resource (e.g. how many entries are in the table). When the resource is a queue, after allocating the memory space for the queue in memory 123, the network device 120 sends a queue response to the host or VM that made the queue request, in process block P3. The queue response includes a location of the queue memory space (e.g. 170) that was allocated for the queue requested. The queue in memory space 170 matches the size requested by the VM in the queue request. The queue response may also include a queue number, and/or a location of the queue registers (e.g. 175). The location of the queue memory space and the location(s) of the queue registers may be sent to host processing logic 110 in the form of offsets of a base address register (BAR) of the BAR of the network device 120. Having this information from the queue response, the VM can write packet descriptors to the first queue in queue memory space 170 and also write to doorbell and/or unmask interrupt registers of queue registers 175, for example.

Process blocks P4-P7 are germane to a specific implementation of the disclosed dynamic resource management where the host requests queues and the network device allocates queues for the host or VMs running on the host. In process block P4 of FIG. 1, VM1 111 may write a packet descriptor to the first queue in queue memory space 170. The network device 120 stores the packet descriptor in an entry of queue memory space 170. The packet descriptor may be written in a Memory-Mapped Input/Output (MMIO) write transaction over a PCI-based bus 150. MMIO refers to using a same addressing scheme on a same bus (e.g. bus 150) so that a processing logic (e.g. host processing logic 110) may address both a memory (e.g. host memory 130) and additional devices (e.g. network device 120) using the same addressing scheme and the same bus. Memory 123 may include Dynamic Random Access Memory (DRAM), Synchronous DRAM (SDRAM), and/or Double Data Rate (DDR), among others. A portion of memory 123 may be reserved for Memory-Mapped Input/Output (MMIO) write transactions initiated by host processing logic 110. Queue memory spaces 170, 180, and 190 as well as queue registers 175, 185, and 195 may be included in the portion of memory 123 reserved for MMIO writes.

The packet descriptor written to an entry of queue memory space 170 may be a DMA descriptor that points to packet data 141 in block 131. The packet data 141 may include a packet payload or a packet header and the corresponding packet payload, for example. Processing logic 127 may utilize a DMA engine 165 to access the DMA descriptor from the entry and fetch packet data 141 from block 131 of host memory 130, at processing block P5. The DMA descriptor may indicate (e.g. point to) the memory location of packet data 141. After fetching packet data 141, processing logic 127 may provide the packet header and packet payload to network interface 197, in processing block P6. Network interface 197 may send out a packet 199 that includes the packet header and packet payload onto a network, in processing block P7. Network interface 197 may be an ethernet interface.

To the extent that the processing blocks P1-P7 are described in terms of VM1 111, driver 116, the first queue, VM1 Block 131, and packet data 141, it is understood that VM2 112 and VMN 114 can also send queue requests and receive queue responses. For example, VM2 112 may send a queue request with a requested size of a queue and processing logic 127 may allocate queue memory space 180 for a second queue to be the requested size. VM2 112 can then write packet descriptors to entries of memory space 180 write to and queue registers 185. DMA engine 165 may process descriptors stored in entries of memory space 180 and fetch second packet data 142 in block 132 that is reserved for VM2 112. Then, network interface may transmit a second packet that includes second packet data 142 on a network. A similar process can be utilized by other VMs up to VMN 114 that are running on host processing logic 110.

Additionally, the above examples are generally described in terms of a VM sending queue requests and receiving queue responses. However, in some examples, a processing core may be responsible for managing the sending and receiving of network packets with network device 120. And, in that case, the processing core would send queue requests and receive the queue responses from network device 120.

Figure 2:
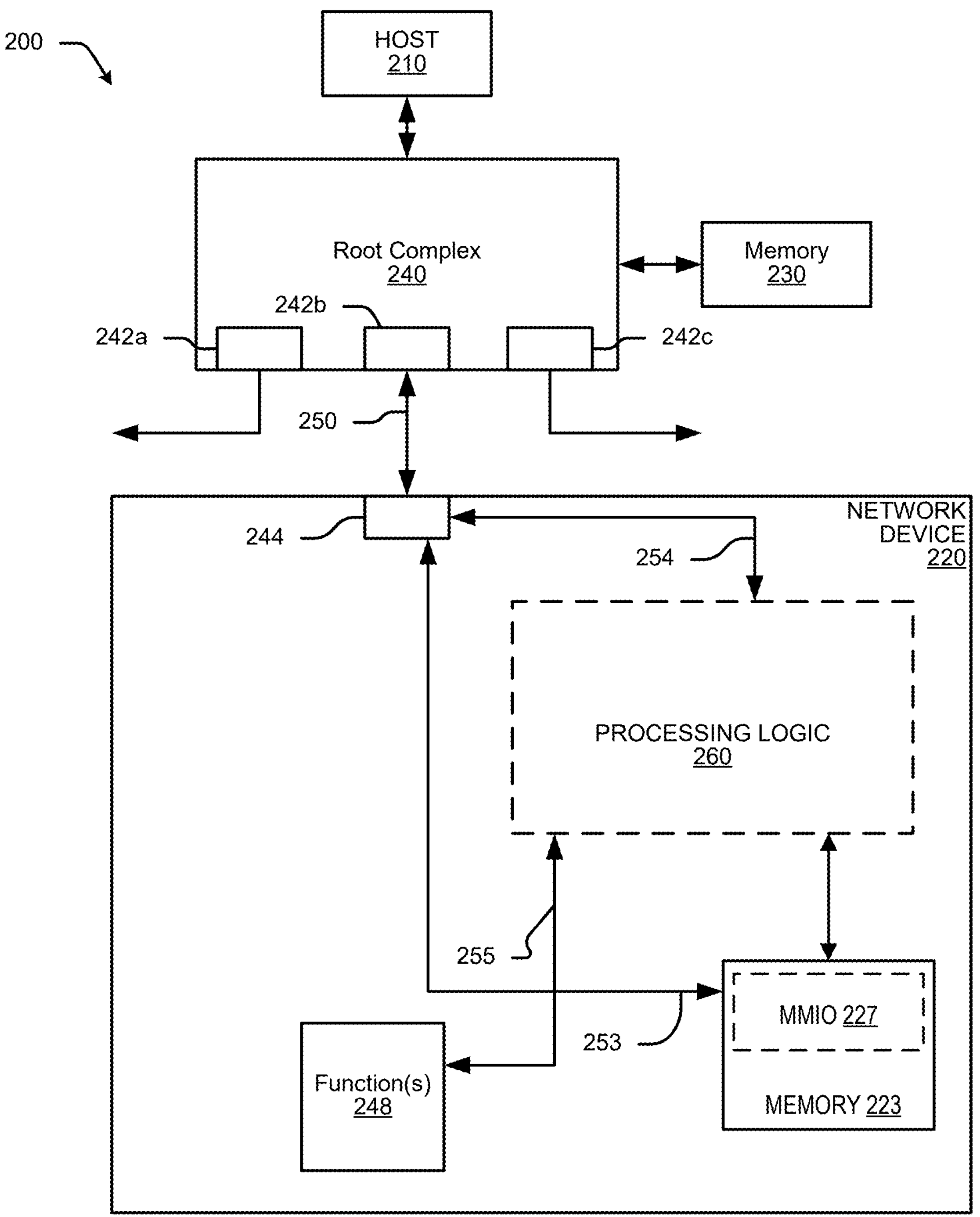
FIG. 2 illustrates an example of a computing system including a host, a memory, and a network device being interconnected.

FIG. 2 illustrates an example of a computing system 200 including host processing logic 210, a memory 230, and a network device 220. Host processing logic 210 is an example of host processing logic 110 and network device 220 is an example of a network device 120. Memory 230 may be used as host memory to host processing logic 210. In the illustrated example, the network device 220 is in communication with a root complex 240 over a PCI interconnect 250. PCI interconnect 250 is one example of bus 150. The root complex 240 is in communication with host processing logic 210 and a memory subsystem 230. In some implementations, the root complex 240 may include a memory controller to manage transactions to and from memory 230. In other implementations, host processing logic 210 may include a memory controller. The queue requests (process block P1 in FIG. 1) and packet descriptors (process block P4 in FIG. 1) may be routed from host processing logic 210 to network device 220 via root complex 240. The queue responses (process block P3 in FIG. 1) may be routed from network device 220 to host processing logic 210 via root complex 240.

Memory subsystem 230 provides temporary or long-term storage for data that may be used by the computing system 200. The root complex 240 may include one or more ports 242*a-c*. These ports 242*a-c* may be connected, using additional PCI interconnects, to PCI switches, bridges, and endpoints, including the illustrated network device 220, which may be a PCI endpoint. The root complex 240 may route transactions between the host processing logic 210 and any of the endpoints, switches, or bridges, or between the endpoints, switches, and bridges themselves. In this example, PCI is used as an example of a bus protocol that may be implemented by the computing system 200 to connect to network device 220 and/or other peripheral devices. In various implementations, the computing system 200 can alternatively or additionally connect to peripheral devices using other bus protocols, such as SCSI, SATA, or PATA, among others, or a combination of different bus protocols including PCI.

The illustrated network device 220 in this example includes a bus interface 244, which may be a PCI-based bus interface configured to send and receive data on a PCI-based bus. Bus interface 244 may include a physical interface for connecting to a cable, socket, port, or other connection to the PCI interconnect 250. The bus interface 244 may further include hardware and/or software to manage incoming and outgoing transactions. The bus interface 244 may translate an internal transaction generated by function(s) 248 or processing logic 260 into a PCI transaction for transmission over the PCI interconnect 250. The bus interface 244 may further translate transactions received over the PCI interconnect 250 for transfer to processing logic 260. Bus interface 244 may receive the queue requests and packet descriptors from host processing logic 210 over PCI interconnect 250, which is an example of bus 150. The bus interface 244 may write the packet descriptors to memory 223 in response to receiving the packet descriptors in an MMIO write transaction from host processing logic 210.

MMIO memory 227 in memory 223 is reserved for MMIO write transactions, in FIG. 2. Registers of the network device 220 may also be mapped in MMIO space. MMIO memory 227 may be reserved in an initialization process upon startup of a computing system, for example. The requested queues and the queue registers may be stored in MMIO memory 227. Memory 223 may include Dynamic Random Access Memory (DRAM), Synchronous DRAM (SDRAM), and/or Double Data Rate (DDR), among others.

Processing logic 260 may include one or more processors, microprocessors, field-programmable gate arrays (FPGAs) or other suitable processing logic. The processors may be general purpose computing devices such as are manufactured by Intel®, AMD®, ARM®, Qualcomm®, and others. Processing logic 260 is generally capable of executing software code. A processor may include multiple processing cores. Processing logic 260 is one example of processing logic 127 and may include the DMA engine 165 of FIG. 1.

Network device 220 includes function(s) 248, in the illustrated embodiment. Function(s) 248 may include hardware and/or software that provide one or more services for the network device 220. A service in this context describes the operations and capabilities of the network device 220, and the functionality that the network device 220 provides to the computing system 200. Function(s) 248 may include the hardware and/or software to provide a network interface, including ports for connecting Category-5 (CAT-5) cables, and/or antennas for connecting wirelessly to a network. Network interface 197 may be included in Function 248. The internal interconnect 254 that connects processing logic 260 with bus interface 244 may be implemented using a standard bus protocol, such as Coherent Hub Interface (CHI), Advanced extensible Interface (AXI), Advanced High-Performance Bus (AHB), or the like. The internal interconnect 254 may also be implemented using a proprietary bus protocol. In one example, an internal interconnect 253 connects bus interface 244 with memory 223 and bus interface 244 can write data to memory 223 without going through processing logic 260. Internal interconnect 253 may use the same bus protocol as internal connect 254. In one embodiment, an internal interconnect 255 connects processing logic 260 with Function(s) 248. Internal interconnect 255 may use the same bus protocol as internal connect 254.

Figure 3:
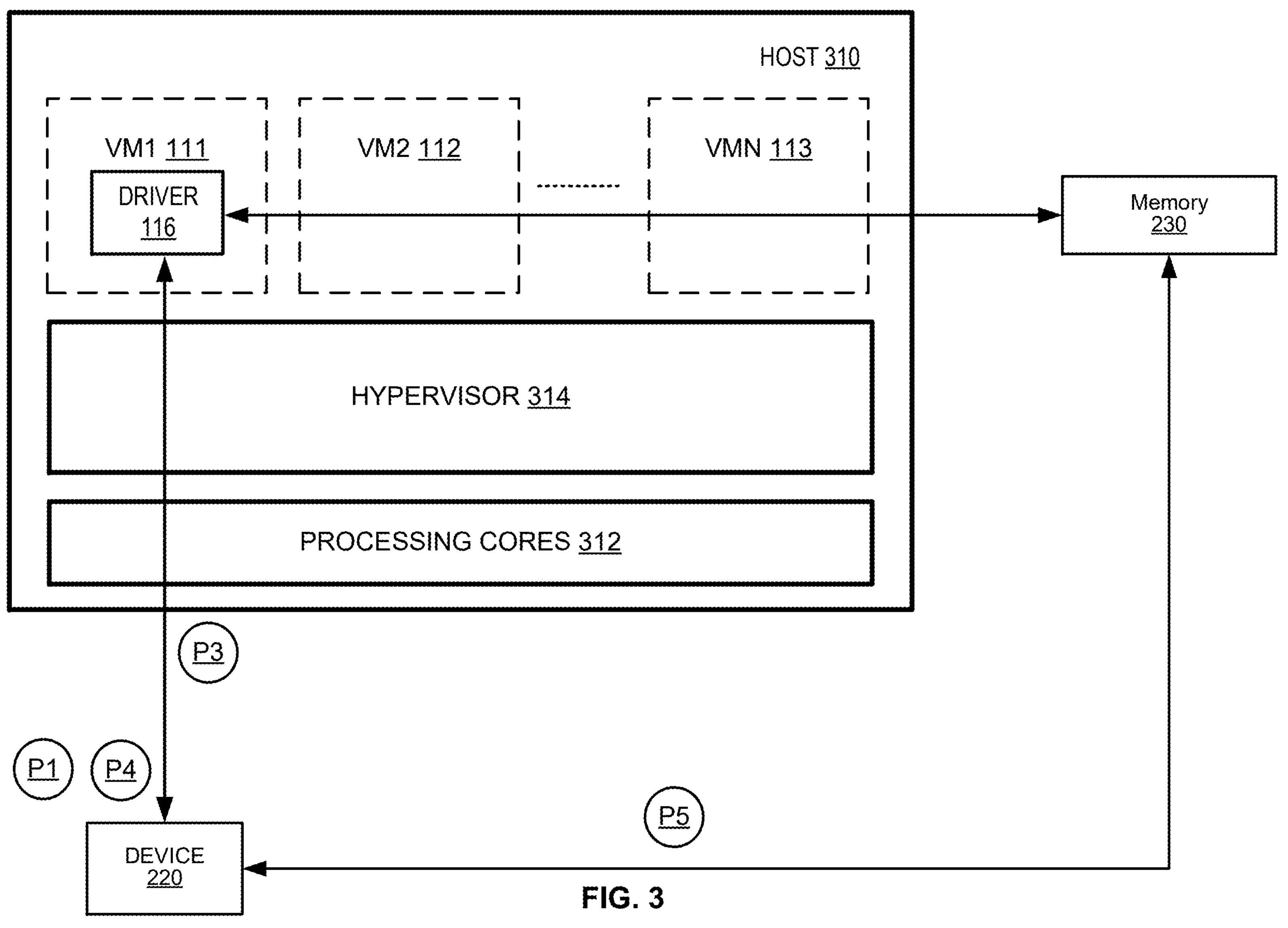
FIG. 3 illustrates an example host that includes processing cores and is running a plurality of virtual machine instances.

FIG. 3 illustrates an example host 310 that includes processing cores 312 and is running a plurality of virtual machine instances VM1 111 through VMN 114. Host 310 may be used in place of host processing logic 110/210, in some examples. In some implementations, host 310 may provide different services such as compute services, network services, etc. to various clients. For example, the compute services may include providing virtual or physical resources to the client computers, e.g., by launching virtual machine instances of various sizes, associating storage volumes to the virtual machines on demand, providing client computers with resources to run applications by renting virtual machines, data processing, storage, etc. The network services may include network related functionalities such as network traffic shaping, network acceleration, network storage processing, network switching, etc. A plurality of VMs 111-114, e.g., a first virtual machine 111, a second virtual machine 112 and an Nth virtual machine 114, may be configured to run on host 310. For example, each of the virtual machines may execute a respective guest operating system (not shown) on host 310.

Host 310 includes a hypervisor 314 and processing cores 312. The processing cores 312 may include a plurality of processing cores that may be configured to execute a plurality of instructions that may be stored in a computer readable storage medium (not illustrated). The computer-readable storage medium may be non-transitory. In some instances, the computer readable medium may be part of a host memory such as memory 230, e.g., RAM, ROM, EEPROM, flash memory or any suitable storage media. In some instances, the host 310 may include an x86 CPU platform, e.g., Xeon, Pentium, etc., an ARM platform, or a PowerPC platform, etc. for running an operating system (not shown). The hypervisor 314 may be configured to manage one or more VMs on the host 310, e.g., to create, start, monitor, stop or to delete the virtual machines 111-114. The hypervisor 314 can also manage the flow of information between software, the virtualized hardware, and the physical hardware.

In the illustrated embodiment, VM1 111 executes driver 116 for interacting with network device 220. Driver 116 controls the writes of queue requests to network device 220, as indicated by the illustrated process block P1 in FIG. 3. Driver 116 may receive the queue response from network device 220, as illustrated by process block P3. Driver 116 may also be responsible for writing packet descriptors to network device 220 (process block P4). Although not illustrated, each VM running on host 310 may have its own driver to interact with network device 220. In one example (not illustrated), the driver is executed by hypervisor 314 rather than by each virtual machine. Virtual machines 111-114 may also be configured to reserve their own block of memory (e.g. block 131) that is specific to their respective guest operating system physical address or virtual address within host memory 230. At process block P5 of FIG. 3, network device 220 may fetch packet data (e.g. 141) from a block of memory (e.g. 131) reserved for a specific VM in response to a packet descriptor that points to a memory location in the block of memory.

Figure 4:
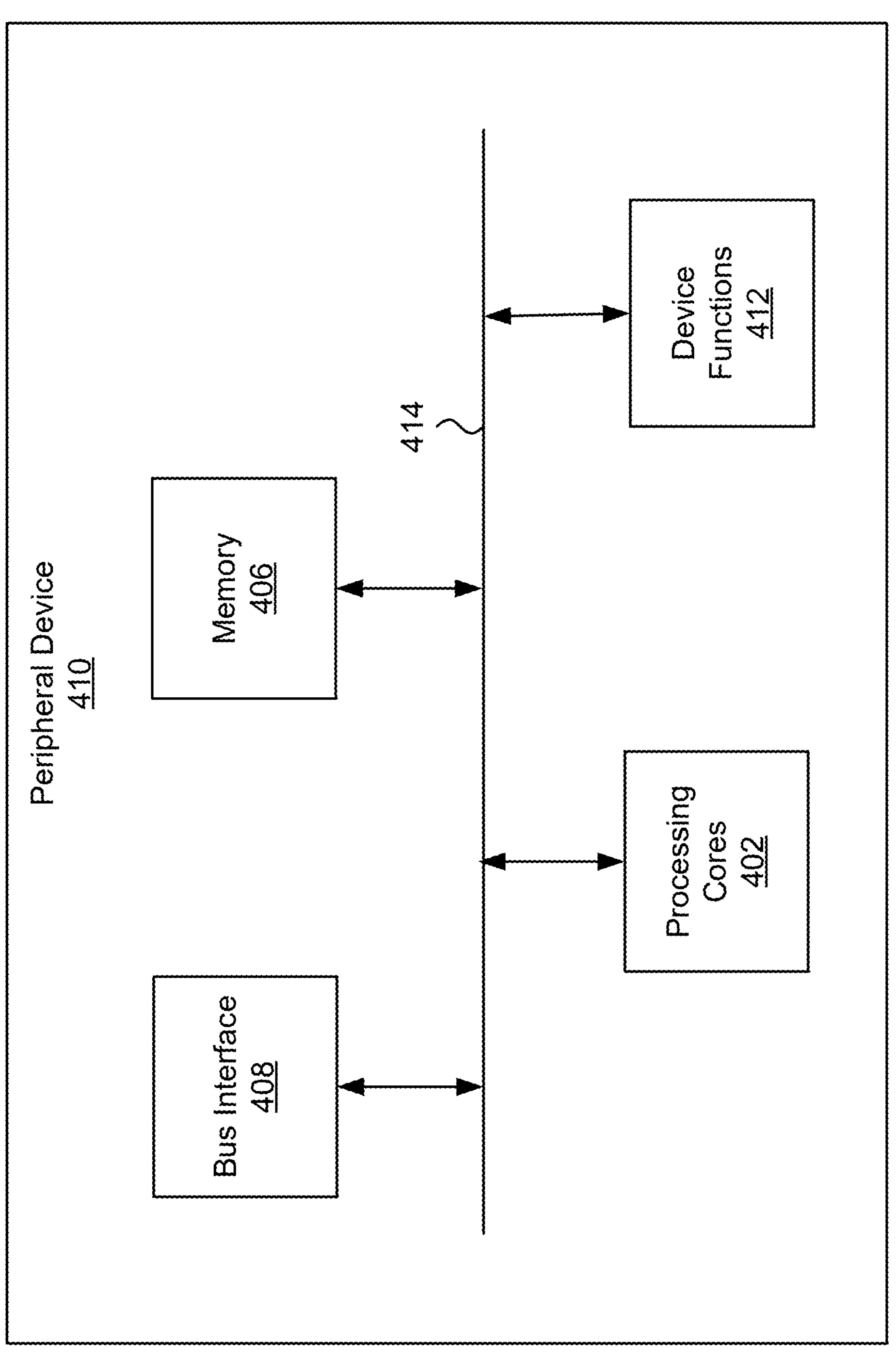
FIG. 4 illustrates an example architecture of a peripheral device that may be used in embodiments of the disclosure.

FIG. 4 illustrates an example architecture of a peripheral device 410 that may be used in embodiments where network devices 120/220 are peripheral devices. Peripheral device 410 includes processing cores 402, a bus interface 408, memory 406, and device functions 412. These modules may be hardware modules, software modules, or a combination of hardware and software. Peripheral device 410 may include additional modules, not illustrated here. In some implementations, peripheral device 410 may include fewer modules. In some implementations, one or more of the modules may be combined into one module. One or more of the modules may be in communication with each other over a communication channel 414. The communication channel 414 may include one or more busses, meshes, matrices, fabrics, a combination of these communication channels, or some other suitable communication channel.

The processing cores 402 may include one or more processors configured to execute instructions. Examples of processors that may be included in the processing cores 402 include processors developed by ARM®, MIPS®, AMD®, Intel®, Qualcomm®, and the like. In some implementations, the processors of the processing cores 402 may share certain resources, such as for example busses, level 1 (L1) caches, and/or level 2 (L2) caches. The instructions executed by the processing cores 402 may be stored on a computer-readable storage medium, for example, in the form of a computer program. The computer-readable storage medium may be non-transitory. In some cases, the computer readable medium may be part of the memory 406.

The memory 406 may include either volatile or non-volatile, or both volatile and non-volatile types of memory. The memory 406 may, for example, include random access memory (RAM), read-only memory (ROM), Electrically Erasable Programmable Read-Only Memory (EEPROM), flash memory, and/or some other suitable storage media.

The bus interface 408 may enable communication with external entities, such as a host device and/or other components in a computing system, over an external communication medium. The bus interface 408 may include a physical interface for connecting to a cable, socket, port, or other connection to the external communication medium. The bus interface 408 may further include hardware and/or software to manage incoming and outgoing transactions. The bus interface 408 may implement a local bus protocol, such as NVMe, AHCI, SCSI, SAS, SATA, PATA, or some other standard protocol, or a proprietary bus protocol. The bus interface 408 may include at least the physical layer for any of these bus protocols, including a connector, power management, and error handling, among other things. In some implementations, peripheral device 410 may include multiple bus interfaces for communicating with multiple external entities. These multiple bus interfaces may implement the same local bus protocol, different local bus protocols, or a combination of the same and different bus protocols.

The device functions 412 may include hardware and/or software for implementing features available to peripheral device 410. The device functions 412 may, for example, include physical connectors for connecting to devices such as printers, monitors, external storage drives, network cables, and other input, output, and/or networking devices. The device functions 412 may further include hardware and/or software configured to implement a protocol for communicating with externally connected devices or functions. For example, the device functions 412 may implement a network interface for communicating with network equipment, such as switches, routers, modems, and/or wireless access points. Alternatively or additionally, the device functions 412 may include hardware and/or software configured to implement functionality provided directly by the peripheral device 410. For example, the device functions 412 may include hardware and/or software configured to implement a solid state hard drive. In some implementations, peripheral device 410 may include multiple device functions, each configured to provide different functionality. For example, in these implementations, peripheral device 410 may include device functions for communicating with a wired Ethernet network, device functions for communicating with a wireless 802.11 network, and device functions providing a storage array.

In some implementations, peripheral device 410 is a PCI-based device. In these implementations, peripheral device 410 includes a PCI interface for communicating with a host device such as host 110/210. A PCI-based device may include one or more functions. A "function" describes operations that may be provided by peripheral device 410. For example, a PCI device may provide a network adapter.

In some implementations, peripheral device 410 may include single-root I/O virtualization (SR-IOV). SR-IOV is an extended capability that may be included in a PCI device. SR-IOV allows a physical resource (e.g., a single network interface controller) to appear as multiple resources (e.g., sixty-four network interface controllers). Thus, a PCI device providing a certain functionality (e.g., a network interface controller) may appear to a device making use of the PCI device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are lightweight functions that lack configuration resources, and are generally controlled by the configuration of their underlying physical functions. Each of the physical functions and/or virtual functions may be assigned to a respective thread of execution (such as for example, a virtual machine) running on a host device.

Figure 5:
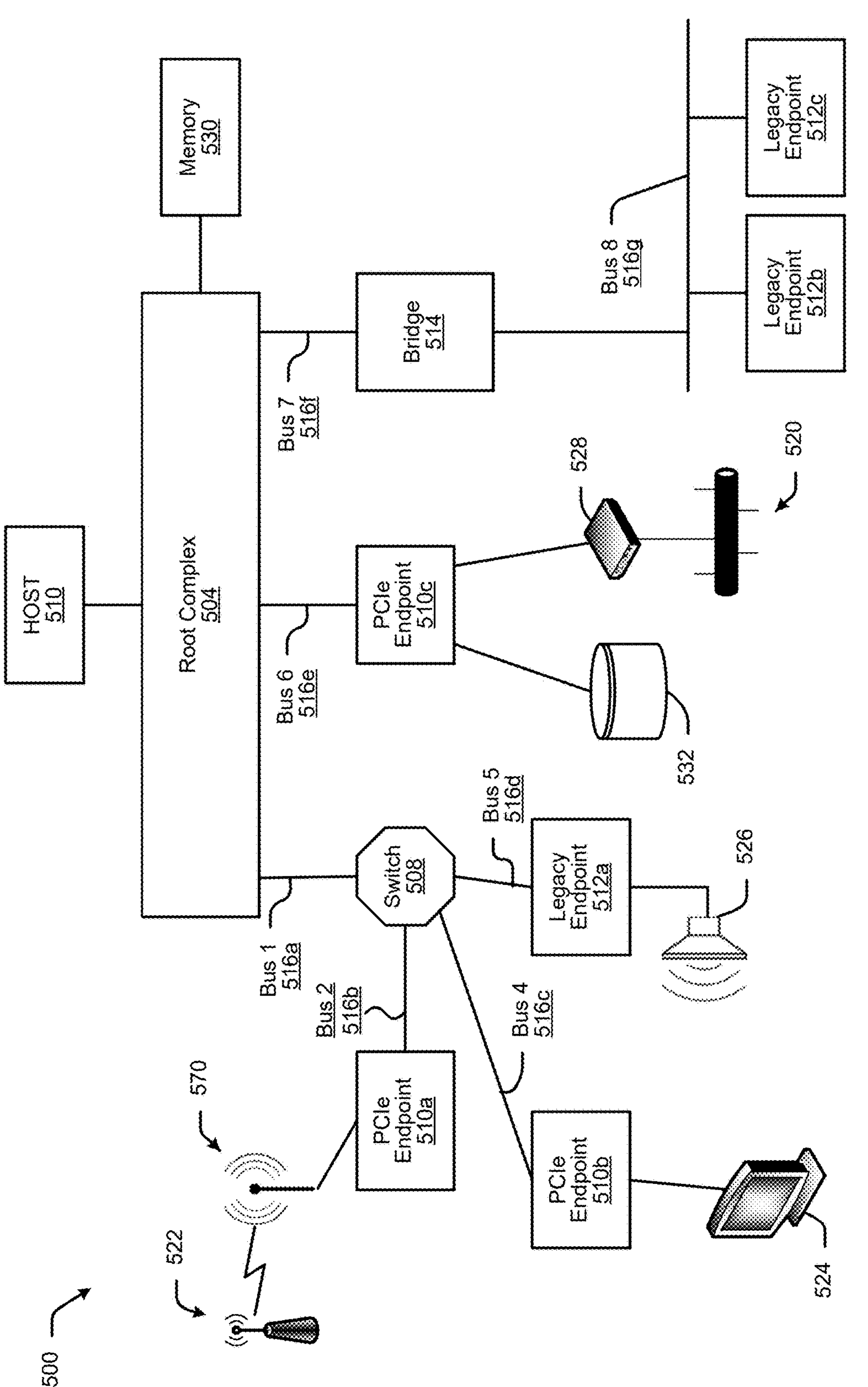
FIG. 5 illustrates an example of a computing system that includes multiple peripheral devices.

FIG. 5 illustrates an example of a computing system 500 that includes multiple peripheral devices. Peripheral devices may include hardware devices and/or devices that include a combination of hardware and software, which can be attached to a computing system to add functionality to the computing system 500. Examples of peripheral devices include wired and/or wireless network adapters (e.g. network interface cards). Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example in FIG. 5 illustrates a computing system 500 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. In the example shown in FIG. 5, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 500 may include host 510, a root complex 504, a memory subsystem 530, a switch 508, a bridge 514, and a number of peripheral devices. In this example, the peripheral devices include PCIe endpoints 510*a-c* and legacy endpoints 512*a-c*. Processors in host 510 may be general purpose computing devices such as are manufactured by Intel®, AMD®, ARM®, Qualcomm®, and others. The processors are generally capable of executing software code. A processor may include multiple processing cores. Host 510 and memory 530 are examples of host 110/210/310, and memory 130/230, respectively.

The root complex 504 may be a hardware device or a hardware and software device that connects host 510 and the memory subsystem 530 to the peripheral devices. The peripheral devices may be connected directly to the root complex 504. For example, the PCIe endpoint 510*c* is connected directly to the root complex 504. Alternatively or additionally, the peripheral devices may be connected to the root complex 504 through a switch 508. A bridge 514 may also be connected to the root complex 504. The root complex 504 may forward transactions to host 510 and direct responses from host 510 back to the peripheral devices. Queue requests and packet descriptors may be routed to peripheral devices through switch 508 or bridge 514. The root complex 504 may further generate transactions on behalf of host 510, and forward responses to those transactions back to host 510. In some cases, the root complex 504 may also route transactions from one peripheral device to another, and/or between peripheral devices, switches, and bridges. The root complex 504 may provide services for the computer system 500, such as a hot plug controller, a power management controller, an interrupt controller, and/or error detection and reporting. In some implementations, the root complex 504 may be implemented as part of a host system that includes one or more integrated processors and memory.

The switch 508 functions as a multi-port connecter between various devices, including the root complex 504, peripheral devices, and possibly other switches and bridges. The switch 508 may route transactions between any of the devices connected to it. For example, the switch 508 may route transactions between the PCIe endpoints 510*a-b* and the legacy endpoint 512*a*, and between the various endpoints 510*a-b*, 512*a* and the root complex 504. The switch 508 may also provide arbitration to prioritize incoming and outgoing transactions. Devices connected to the switch 508 may treat the switch 508 as another requester and/or completer. Though not illustrated here, switches can also be connected to other switches to further expand the number of peripheral devices that can be connected to the computing system 500.

The bridge 514 may provide connectivity to other busses or switching fabrics. The other busses or switching fabrics may implement a PCI variant or another protocol. For example, in the example of FIG. 5, the bridge 514 provides connectivity to a bus implementing the original PCI standard. The bridge 514 may include mechanisms to translate from one bus protocol, such as the original PCI standard, to another protocol, such as PCIe.

Components in the computing system 500 may be connected through a shared bus. For example, in the illustrated example, the legacy endpoints 512*b-c* are connected to a shared PCI bus 516*g*. Alternatively or additionally, peripheral devices may be connected to the computing system 500 in a switching fabric topology. The interconnected devices illustrated in FIG. 5, including the root complex 504, the switch 508, the bridge 514, and the PCIe endpoints 510*a-c*, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 5, the switch 508 is connected to the root complex 504 with Bus 1 516*a* and the PCIe endpoint 510*c* is connected to the root complex with Bus 6 516*e*. Similarly, the bridge 514 is connected to the root complex with Bus 7 516*f*. Each of the PCIe endpoints 510*a-b* and the legacy endpoint 512*a* are also connected to the switch 508*a* with individual busses 516*b-d*. The connections between each of the root complex 504, the switch 508, the bridge 514, the PCIe endpoints 510*a-c* and the legacy endpoint 512*a* are point-to-point because each of the busses 516*a-g* are not shared with another device. Furthermore, a packet directed from one device to another (for example, from the root complex 504 to the PCIe endpoint 510*a*) is routed directly to its destination.

In some implementations, the connections between the devices in the computing system 500 may be numbered. For example, in the illustrated example, the connection between the switch 508 and the root complex 504 is labeled Bus 1 516*a* (Bus 0 may be internal to the root complex 504). Similarly, each of the busses connecting the PCIe endpoints 510*a-b* and the legacy endpoint 512*a* to the switch 508 are labeled Bus 2 516*b*, Bus 4 516*c*, and Bus 5 516*d*, respectively (Bus 2 may be internal to the switch 508). Furthermore, the connection between the root complex 504 and the PCIe endpoint 510*c* may be labeled Bus 6 516*e*, while the connection between the root complex and the bridge 514 may be labeled Bus 7 516*f*. Finally, the shared bus downstream from the bridge 514 may be labeled Bus 8 516*g*. In most cases the numbering of the busses is arbitrary, though bus numbers are generally assigned in a logical fashion. For example, Bus 0 may be located within the root complex 504, and the bus label may increment as the distance between the bus and the root complex 504 increases.

As noted above, peripheral devices may add to and/or modify the functionality of the computing system 500. For example, one PCIe endpoint 510*a* may implement a Wi-Fi adapter 570. Using the Wi-Fi adapter 570, the computing system 500 may be able to communicate wirelessly with a wireless access point 522, and thereby access a network. As another example, another PCIe endpoint 510*b* may implement a video card. A video card may include a port to connect a monitor 524 or other display device. As a further example, the computing system 500 may include a legacy endpoint 512*a* that implements a sound card. A sound card may include a port or jack that accepts a plug for a speaker 526 or other audio output device.

In some cases, a PCIe endpoint may be a multi-function device, that is, a device that provides the services of multiple devices. For example, the PCIe endpoint 510*c* may include an Ethernet adapter, and provide a connection to a gateway device 528, such as a DSL or cable modem. The PCIe endpoint 510*c* may also include a storage adapter, and provide a connection to a storage device 532. The one PCIe endpoint 510*c* thus may provide access to a network 520, as well as access to a storage device 532. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number.

When a computing system such as computing system 500 illustrated in FIG. 5 initially powers up, host 510 may be unaware of any peripheral devices that are connected to the system. Host 510 may be aware of the root complex 504, and possibly also that the root complex 504 is connected to one or more busses. To learn about the rest of the system, host 510 may execute a process to scan and configure the system. This process may be referred to as an enumeration process. The specific process of scanning for, locating, and identifying peripheral devices may be called discovery or discovering. During an enumeration process, software executing on the host 510 may first scan each of the busses 516*a*, 516*e*, 516*f* connected to the root complex 504, and identify the switch 508, the PCIe endpoint 510*c*, and the bridge 514. Upon discovering the switch 508, host 510 may next scan the busses 516*b-d* connected to the switch 508. Host 510 thereby discovers the PCIe endpoints 510*a-c* and the legacy endpoint 512*a*. Upon discovering the bridge 514, host 510 may also scan Bus 8 516*g*; however, the bridge 514 may translate the scanning instructions to the protocol implemented by Bus 8 516*g*.

While scanning the busses, or possibly after, host 510 may also transmit configuration transactions to each of the devices it discovers. Configuration may include, for example, assigning one or more address spaces. For example, PCI devices typically include one or more of a memory address space and/or an I/O address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on host 510 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, host 510 may also read information from configuration registers. For example, the PCIe endpoint 510*c* may include a configuration register that indicates that it has two functions. The PCIe endpoint 510*c* may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 508 and the bridge 514 also include a configuration space with configuration registers. In such implementations, host 510 may discover the switch and bridge functionality by reading configuration registers in the switch 508 and the bridge 514. The switch 508 and the bridge 514 may also be configured by host 510, for example with bus and device numbers.

Figure 6:
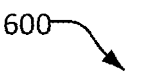
FIG. 6 illustrates an example flow chart demonstrating an example process of allocating resources of a network device.
Figure 6:
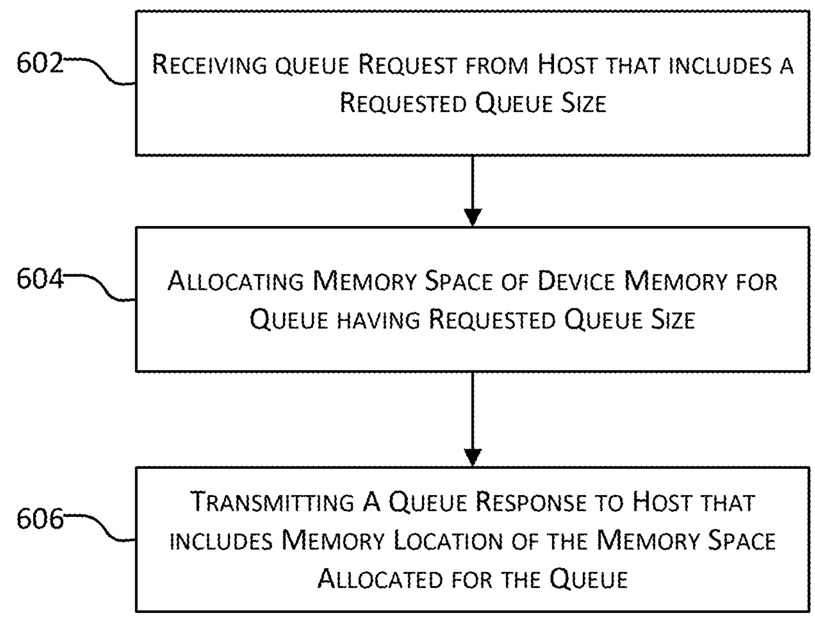

FIG. 6 depicts an illustrative flow chart demonstrating an example process 600 of allocating resources of a network device. The network device may be a network interface card (NIC). The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by network devices 120 or 220. The code may be stored on a computer-readable storage medium of network device 120 or 220, for example, in the form of a computer program including a plurality of instructions executable by one or more processors. The computer-readable storage medium may be non-transitory.

In process block 602, a queue request from a host is received by a network device. The queue request includes a requested queue size. Virtual machines running on the host may send queue requests having a request queue size that corresponds to a volume of packets that the respective VM needs or will utilize. The queue request may be received by a bus interface (e.g. bus interface 244) of the network device. The host may send the queue requests to the network device over a PCI-based bus. The bus interface may be a PCI-based bus interface.

In response to receiving each queue request, the network device allocates memory space in its device memory for the requested queue having the requested queue size, in process block 604. The memory space size corresponds to the requested queue size included in the particular queue request.

In process block 606, the network device transmits a queue response back to the host. The queue response may be sent back to the VM of the host that sent the queue request. The queue response includes the memory location of the memory space (e.g. 170, 180, 190) that was allocated for the requested queue.

In one example, a particular VM may transmit a first packet descriptor of a first packet to the network device. The first packet is addressed to a memory location within the memory space that was allocated for a queue of the particular VM in response to a queue request from the VM. The network device stores the first packet descriptor to a first address in the memory space allocated for the queue. The network device then fetches first packet data (e.g. payload or header and payload) from host memory of the host according to the packet descriptor. The packet descriptor may include the address for the first packet data. The VM may have previously stored the first packet data to the host memory. Fetching the first packet data may include DMA Operations over a PCI-based bus interconnecting the host memory and the network device. After the network device gets the first packet data from host memory, a network interface transmits the first packet onto a network.

Figure 7:
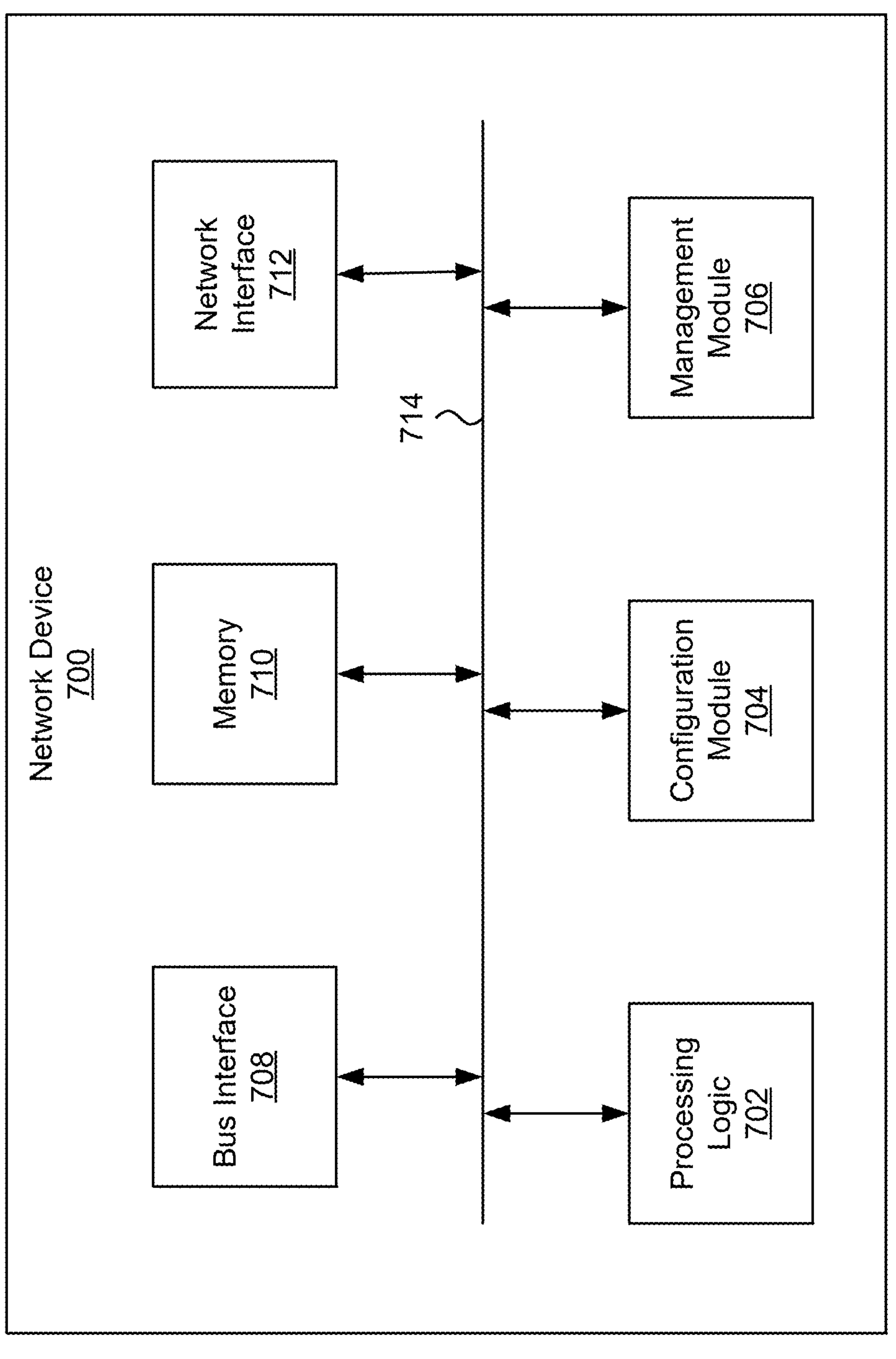
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. For example, network devices 120/220 may include all or some of the modules of network device 700. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
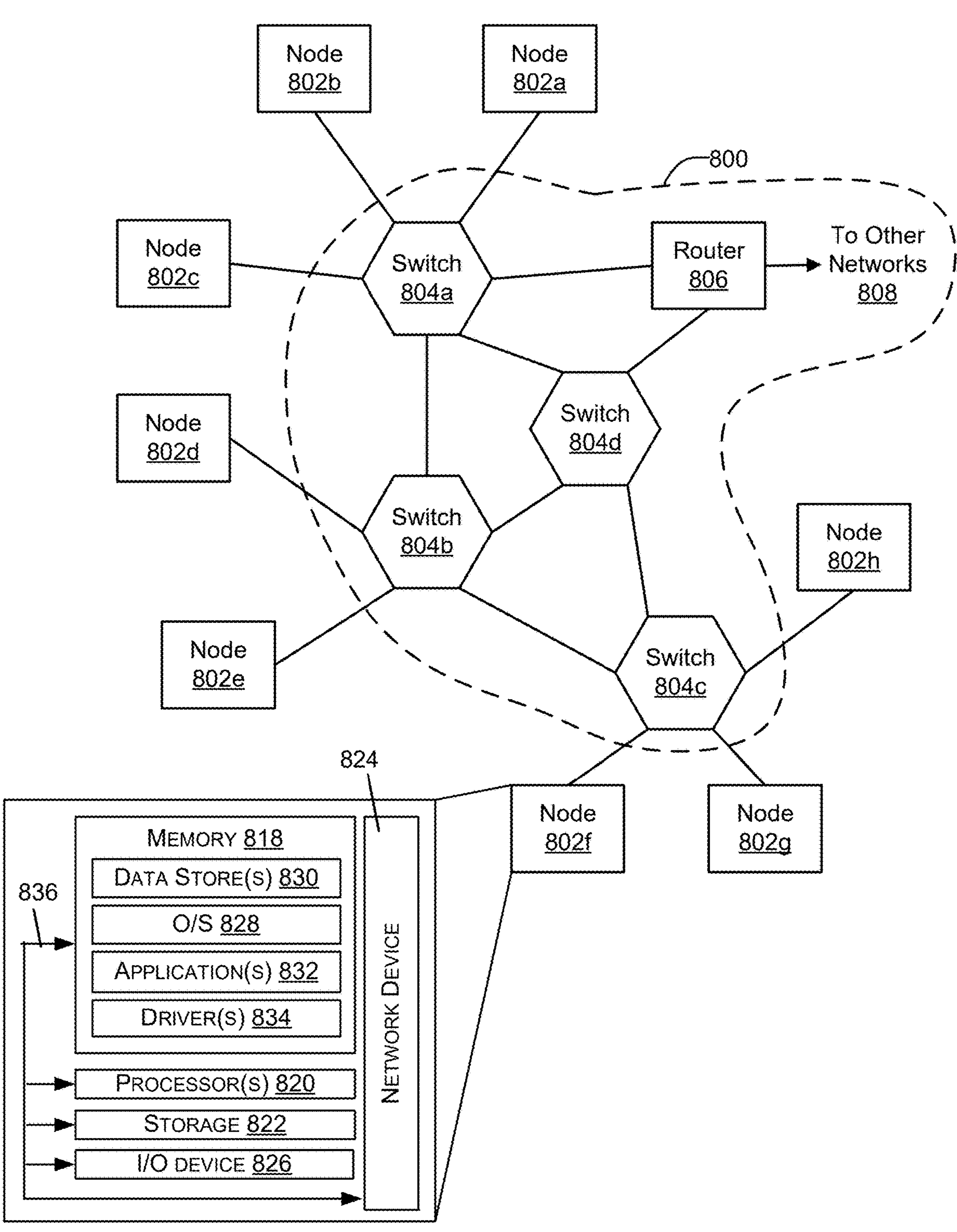
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804*a*-804*d*, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804*a*-804*d* may be connected to a plurality of nodes 802*a*-802*h* and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804*a*-804*d* and router 806, if present, may be referred to as a switch fabric, a fabric, a network fabric, or simply a network. In the context of a computer network, terms "fabric" and "network" may be used interchangeably herein.

Nodes 802*a*-802*h* may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s)

may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802*a*-802*h* may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802*a*-802*h*, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802*a*-802*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802*a*-802*h* or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802*a*-802*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802*a*-802*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802*a*-802*h* may also include I/O device(s) 826, such as a keyboard, a mouse, a pen, a voice input device, a touch input device, a display, speakers, a printer, and the like. The node(s) 802*a*-802*h* may also include one or more communication channels 836. A communication channel 836 may provide a medium over which the various components of the node(s) 802*a*-802*h* can communicate. The communication channel or channels 836 may take the form of a bus, a ring, a switching fabric, or a network.

The node(s) 802*a*-802*h* may also contain network device(s) 824 that allow the node(s) 802*a*-802*h* to communicate with a stored database, another computing device or server, user terminals and/or other devices on the network(s) 800. The network device(s) 824 of FIG. 8 may include similar components discussed with reference to the network device 700 of FIG. 7. In some implementations, the network device 824 is a peripheral device, such as a PCI-based device. In these implementations, the network device 824 includes a PCI interface for communicating with a host device.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:

host processing logic; and a peripheral bus communicatively coupling the host processing logic to a bus interface of a peripheral device having a device memory, wherein the host processing logic is configured to:

send a queue request to the peripheral device over the peripheral bus, the queue request including a size of a queue to be created in the device memory;

receive a queue response from the peripheral device that is responsive to the queue request, the queue response including information indicating:

a first location of a queue register for managing the queue; and a second location of a queue memory space allocated for the queue in the device memory by the peripheral device;

send a descriptor to the queue memory space; and perform a data transfer with the peripheral device based on the descriptor.

2. The system of claim 1, wherein the location of the queue memory space in the device memory is determined by the peripheral device instead of the host processing logic.

3. The system of claim 1, wherein the peripheral device is a network device.

4. The system of claim 1, wherein the queue request is generated by a virtual machine.

5. The system of claim 1, wherein the queue is a submission queue.

6. The system of claim 1, wherein the queue is a completion queue.

7. A peripheral device comprising:

an interface;

a device memory; and processing logic coupled to the interface and configured to read and write to the device memory, wherein the peripheral device is configured to:

receive, by the interface, a resource request from host processing logic, wherein the resource request includes a requested resource size;

allocate a resource of the peripheral device in response to the resource request; and transmit, by the interface, a resource response to the host processing logic, the resource response including a first element indicating a location of the allocated resource, and a second element indicating an allocated size of the allocated resource.

8. The peripheral device of claim 7, wherein the location of the allocated resource is determined by firmware of the peripheral device.

9. The peripheral device of claim 7, wherein the resource request is a first resource request from a first virtual machine of the host processing logic, and the requested resource size is a first requested resource size, and wherein the peripheral device is configured to:

receive, by the interface, a second resource request from a second virtual machine of the host processing logic, wherein the second resource request includes a second requested resource size of the resource; and allocate the resource of the peripheral device to the second virtual machine based on the second requested resource size in response to the second resource request.

10. The peripheral device of claim 7, wherein the resource request is a first resource request from a virtual machine of the host processing logic, and the requested resource size is a first requested resource size, and wherein the peripheral device is configured to:

receive, by the interface, a second resource request from the virtual machine of the host processing logic, wherein the second resource request includes a second requested resource size of the resource; and adjust the allocated size of the allocated resource according to the second requested resource size in response to the second resource request.

11. The peripheral device of claim 7, wherein the peripheral device is configured to allocate a management resource to the host processing logic for managing the resource.

12. The peripheral device of claim 11, wherein the resource is a queue, and the management resource is a queue register for managing the queue.

13. The peripheral device of claim 12, wherein the queue register is a doorbell register or an unmask interrupt register.

14. The peripheral device of claim 7, wherein the resource is a buffer or a table.

15. The peripheral device of claim 7, wherein the peripheral device includes a networking function.

16. A method comprising:

receiving, by an interface of a peripheral device, a resource request from host processing logic, wherein the resource request includes a requested resource size;

allocating a resource of the peripheral device in response to the resource request; and transmitting, by the interface, a resource response to the host processing logic, the resource response including a first element indicating a location of the allocated resource, and a second element indicating an allocated size of the allocated resource.

17. The method of claim 16, wherein the location of the allocated resource is determined by firmware of the peripheral device.

18. The method of claim 16, wherein the resource request is a first resource request from a first virtual machine of the host processing logic, and the requested resource size is a first requested resource size, and wherein the method further comprises:

receiving, by the interface, a second resource request from a second virtual machine of the host processing logic, wherein the second resource request includes a second requested resource size of the resource; and allocating the resource of the peripheral device to the second resource requester based on the second requested resource size in response to the second resource request.

19. The method of claim 16, wherein the resource request is a first resource request from a virtual machine of the host processing logic, and the requested resource size is a first requested resource size, and wherein the method further comprises:

receiving, by the interface, a second resource request from the virtual machine of the host processing logic, wherein the second resource request includes a second requested resource size of the resource; and adjusting the allocated size of the allocated resource according to the second requested resource size in response to the second resource request.

20. The method of claim 16, wherein the resource is a queue, a buffer, or a table.

* * * * *